(Model.)

W. M. CLEELAND.
HOOF TRIMMER.

No. 271,038. Patented Jan. 23, 1883.

WITNESSES:
J. D. Garfield
C. Sedgwick

INVENTOR:
W. M. Cleeland
BY Munn & Co
ATTORNEYS.

United States Patent Office.

WILLIAM M. CLEELAND, OF McCAULEYVILLE, MINNESOTA.

HOOF-TRIMMER.

SPECIFICATION forming part of Letters Patent No. 271,038, dated January 23, 1883.

Application filed June 23, 1882. (Model.)

*To all whom it may concern:*

Be it known that I, WILLIAM MORRISON CLEELAND, of McCauleyville, in the county of Wilkin and State of Minnesota, have invented a new and Improved Hoof-Trimmer, of which the following is a full, clear, and exact description.

My invention consists of a lever trimming device for trimming the edges of animal hoofs even with the edges of the shoes, as heretofore done with the toe-knife and hammer, the said lever device being provided with a gage to regulate the cutter with respect to the amount required to be cut off, and the cutter-arm being arranged with respect to its pivot for the best operation in the trimming of the hoofs, as hereinafter fully described.

Reference is to be had to the accompanying drawings, forming part of this specification, in which similar letters of reference indicate corresponding parts in both the figures.

Figure 1:
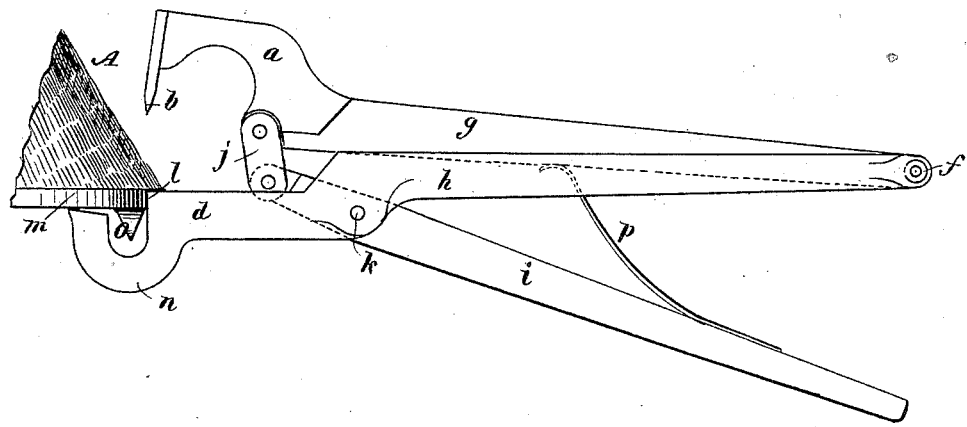
Figure 2:
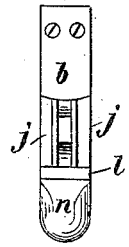

Figure 1 is a side elevation of my improved hoof-trimmer together with a part of a hoof to illustrate the operation, and Fig. 2 is a front elevation of the trimmer.

The trimmer is constructed essentially in the form of cutting-nippers; but instead of being pivoted together near the ends of the cutting-jaws, so as to swing on a short radius and thus cut too much in a circle for properly trimming off the edges of the hoofs A, the jaw $a$, to which the cutter $b$ is attached, and the jaw $d$, against which the cutter acts, are pivoted at the opposite extremities, $f$, of their stocks $g$ $h$, in order that the radius of the cutter may be such that the cut will sufficiently approximate the straight line to be satisfactory, and the lever $i$ is connected with the jaw or stock $a$ $g$ by links $j$ and pivoted to the stock $h$ at $k$ for working it, in the manner clearly shown in Fig. 1. The stock $h$ is bifurcated from the joint $k$ back to its rear end to allow the upper arm, $g$, to close between its legs, and to allow the spring $p$, attached to the arm $i$, to operate against said arm G. When the implement is closed it is neat and compact in appearance. The end $l$ of jaw $d$ forms a gage to regulate the amount to be trimmed off by bearing against the edge of the shoe $m$, as shown, and the hooked-shaped projection or anvil $n$ from the lower side of said jaw bears against the under side of the shoe back of the calk $o$, to form the support for the fulcrum of the lever $i$.

Besides being easier to work and more exact in the performance of the work, the device is much better for use upon restive animals, because its action is quicker and the pounding of the hammer upon the knife is avoided.

The spring $p$, attached to the lever $i$ and bearing against stock $g$, opens the implement and keeps it open, ready for use.

I am aware that hoof-trimmers have been patented which operate like mine with a shearing-blade, an anvil to support the shoe, and a gage-face to operate against the perimeter of the shoe, and that others show a combination of levers and toggle-joints operating on the same principle as mine, and I do not claim these features, broadly; but

What I claim, and wish to secure by Letters Patent, is—

1. The combination, with the anvil $n$, gage-bar $d$ $l$, and bifurcated stock $h$, of the arm $a$ $g$, pivoted at $f$ to the rear end of the stock $h$, the shear block $b$, link $j$, and the lever $i$, pivoted in the bifurcated stock $h$ at $k$.

2. The combination, with the bifurcated stock $h$, the cutter-arm $a$ $g$, pivoted to said stock at $f$, the link $j$, and lever $i$, of the spring $p$, secured to lever $i$ and operating between the legs of stock $h$ against the cutter-arm $g$, as shown and described.

WILLIAM MORRISON CLEELAND.

Witnesses:
JAS. R. HARRIS,
C. W. McCAULEY.